W. P. QUIGGLE.
GRAIN TANK SEAT.
APPLICATION FILED JULY 17, 1915.
1,216,730.                                    Patented Feb. 20, 1917.
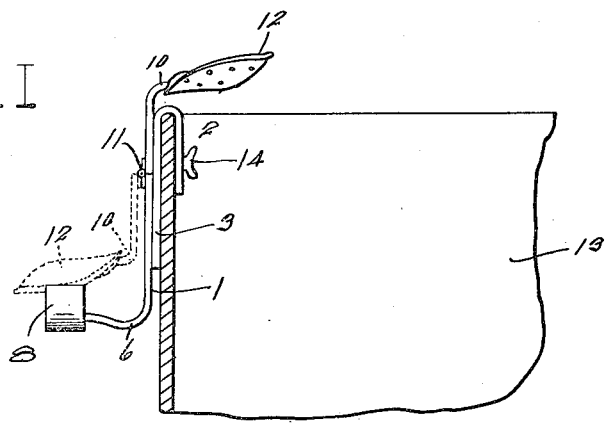
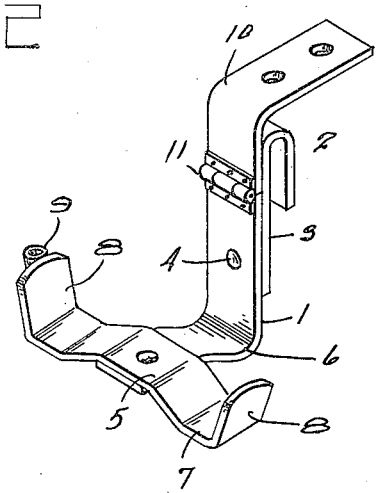
Witnesses
Chas. H. Trott
H. J. Riley
Inventor
W. P. Quiggle
By
Attorney

UNITED STATES PATENT OFFICE.

WALTER P. QUIGGLE, OF BAKER, MINNESOTA.

GRAIN-TANK SEAT.

1,216,730.   Specification of Letters Patent.   Patented Feb. 20, 1917.

Application filed July 17, 1915. Serial No. 40,471.

*To all whom it may concern:*

Be it known that I, WALTER P. QUIGGLE, a citizen of the United States, residing at Baker, in the county of Clay and State of Minnesota, have invented certain new and useful Improvements in Grain-Tank Seats; and I do hereby declare the following to be a full, clear, and exact description of the invention, such as will enable others skilled in the art to which it appertains to make and use the same.

The invention relates to a grain tank seat.

The object of the present invention is to improve the construction of vehicle seats and to provide a simple, inexpensive and efficient grain tank seat adapted to be readily applied to and removed from a vehicle having a grain tank and capable of being engaged over the upper edge of the tank in convenient position for holding the reins and controlling a team.

A further object of the invention is to provide a device of this character equipped with seat holding means adapted to be readily swung out of the way from over the tank when not in use without removing the device from the tank.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawing

Figure 1 is a side elevation of a grain tank seat constructed in accordance with this invention and shown applied to a portion of a grain tank, the latter being in section, Fig. 2 is a perspective view of the device detached, the seat proper, being removed.

Like numerals of reference designate corresponding parts in the several figures of the drawing.

In the accompanying drawing in which is illutsrated the preferred embodiment of the invention, the device comprises in its construction a bracket or hanger composed of an approximately L-shaped section 1, and a substantially inverted U-shaped section 2 having one of its sides 3 extended downwardly beyond the plane of the other side and secured by one or more rivets 4 or other suitable fastening means to the L-shaped section. The L-shaped section 1 is composed of a vertical arm or portion which is fitted against the extended side or leg of the U-shaped section and a horizontal forwardly extending arm to which a foot rest 5 is secured by one or more rivets or other suitable fastening means.

The forwardly extending arm 6 which is preferably provided with a slight upward bend as shown has its outer portion arranged in a horizontal plane and the foot rest is disposed transversely of the horizontal outer portion and is provided at opposite sides of the same with depending bends 7 and upwardly extending terminal portions 8. The right hand upwardly extending terminal portion 8 supports a whip socket 9 which may be secured to the foot rest in any suitable manner.

Mounted upon the upper portion of the bracket or hanger is a seat support 10 of approximately L-shape composed of a vertical portion and a horizontal portion, the vertical portion being secured to the bracket or hanger at the lower end thereof by means of a hinge 11 which permits the seat support and a seat 12 to be swung downwardly from the position shown in full lines in Fig. 1 of the drawing to that illustrated in dotted lines in the said figure to carry the seat out of the way and from a position over a grain tank 13, to a point in advance of the same. The inverted U-shaped portion or section of the hanger or bracket forms an upper hook which is adapted to be engaged over the upper edge of the grain tank as shown in Fig. 1 and the device is firmly secured to the tank by a set screw 14 mounted in a threaded perforation of the inner or rear side or leg of the U-shaped section and engaging the inner face of the tank.

The device is adapted to be readily applied to and removed from the tank or similar body and the seat extends rearwardly over the front portion of the same and may be readily swung out of the way when not in use.

The seat may be secured to the rearwardly extending horizontal arm of the seat support by any suitable fastening means. While the hanger or bracket is illustrated in the accompanying drawing as constructed of several sections it may of course be made of a single piece of metal as will be readily understood.

What is claimed is:—

1. A device of the class described including a hanger consisting of a vertical bar provided at its upper end with a hook for engaging a body or receptacle at the upper edge thereof, an L-shaped section having one of its arms arranged vertically and secured to the front face of the lower portion of the vertical bar, a foot rest carried by the said section, and a seat having an approximately L-shaped support or standard having one of its arms arranged vertically and hinged to the vertical arm of the said L-shaped section and fitting against the front face of the upper portion of the said vertical bar, said seat and support or standard being adapted to swing downward beyond and entirely clear of the top of the bracket.

2. A device of the class described including a hanger or bracket provided at its upper end with a hook for engaging over the upper edge of a body or receptacle, a seat having a standard or support hinged to the bracket below the top thereof so as to swing downwardly entirely clear of the top of the bracket, a forwardly extending arm connected with the lower portion of the said bracket, a whip socket, and a foot rest consisting of a transversely disposed bar secured to and extending from opposite sides of the arm and having an upturned terminal forming a guard and a support for the whip socket which is secured to the said upturned terminal.

In testimony whereof I affix my signature in presence of two witnesses.

WALTER P. QUIGGLE.

Witnesses:
C. S. PILOT,
PEARL BRUNER PILOT.

Copies of this patent may be obtained for five cents each, by addressing the "Commissioner of Patents, Washington, D. C."